US012756537B2

(12) United States Patent
Ma et al.

(10) Patent No.: US 12,756,537 B2
(45) Date of Patent: Oct. 6, 2026

(54) ANONYMOUS DATA RETRIEVAL METHOD, CLIENT AND SERVER

(71) Applicant: Lenovo (Beijing) Limited, Beijing (CN)

(72) Inventors: Yilong Ma, Beijing (CN); Xiaobing Guo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 40 days.

(21) Appl. No.: 19/011,319

(22) Filed: Jan. 6, 2025

(65) Prior Publication Data

US 2025/0233724 A1 Jul. 17, 2025

(30) Foreign Application Priority Data

Jan. 17, 2024 (CN) ......................... 202410070453.5

(51) Int. Cl.

| | |
|---|---|
| ***H04L 9/00*** | (2022.01) |
| ***G06F 16/90*** | (2019.01) |
| ***G06F 16/906*** | (2019.01) |
| ***G06F 21/60*** | (2013.01) |
| ***G06F 21/62*** | (2013.01) |
| ***H04L 9/06*** | (2006.01) |
| ***H04L 9/08*** | (2006.01) |
| ***H04L 9/40*** | (2022.01) |

(52) U.S. Cl.

CPC ............ *H04L 9/008* (2013.01); *G06F 21/602* (2013.01); *G06F 21/6227* (2013.01); *G06F 21/6254* (2013.01); *H04L 9/0618* (2013.01); *H04L 9/0869* (2013.01); *H04L 63/0428* (2013.01); *G06F 16/90* (2019.01); *G06F 16/906* (2019.01)

(58) Field of Classification Search

CPC ..... H04L 9/008; H04L 9/0618; H04L 9/0869; H04L 63/0428; G06F 16/90; G06F 16/906; G06F 21/6227; G06F 21/602; G06F 21/6254

USPC .......................................................... 380/28

See application file for complete search history.

(56) References Cited

U.S. PATENT DOCUMENTS

| | | | | |
|---|---|---|---|---|
| 8,832,427 | B2 * | 9/2014 | Roeder | G06F 21/602 713/150 |
| 12,164,664 | B1 * | 12/2024 | Dupont | G06F 21/6227 |
| 12,566,997 | B2 * | 3/2026 | Mauser | G06F 21/6245 |

(Continued)

OTHER PUBLICATIONS

Majeed et al. "Anonymization Techniques for Privacy Preserving Data Publishing: A Comprehensive Survey", IEEE Access, vol. 9, 2021, Jan. 14, 2021, pp. 8512-8545 (Year: 2021).*

(Continued)

*Primary Examiner* — James D Nigh

(74) *Attorney, Agent, or Firm* — ANOVA LAW GROUP, PLLC

(57) ABSTRACT

An anonymous data retrieval method includes obtaining retrieval data and a first label provided by a server and matching the retrieval data, performing linear homomorphic encryption on the retrieval data and the first label to obtain retrieval data ciphertext, searching the server for a second label according to the retrieval data ciphertext, and performing anonymous retrieval on the server according to the second label and encrypted first label to obtain candidate data that matches the retrieval data.

17 Claims, 4 Drawing Sheets

(56) References Cited

U.S. PATENT DOCUMENTS

| | | | | |
|---|---|---|---|---|
| 2007/0140479 | A1 * | 6/2007 | Wang | H04L 9/30 380/30 |
| 2019/0020477 | A1 * | 1/2019 | Antonatos | H04L 9/0894 |

OTHER PUBLICATIONS

Gong et al. "Research on Database Ciphertext Retrieval Based on Homomorphic Encryption", 2017 IEEE, pp. 149-152 (Year: 2017).*

Mittal et al. "Secure Data Mining in Cloud Using Homomorphic Encryption", 2014 IEEE International Conference on Cloud Computing in Emerging Markets (CCEM), Published Jan. 22, 2015, 6 pages (Year: 2015).*

Zyskind et al. "Don't forget private retrieval: distributed private similarity search for large language models", arXiv:2311.12955v1, Nov. 21, 2023, 10 pages (Year: 2023).*

Angel et al. "PIR with compressed queries and amortized query processing", 2018 IEEE Symposium on Security and Privacy May 20-24, 2018, published Jul. 26, 2018, 17 pages (Year: 2018).*

* cited by examiner

ANONYMOUS DATA RETRIEVAL METHOD, CLIENT AND SERVER

CROSS-REFERENCE TO RELATED APPLICATION

This application claims priority to Chinese Patent Application No. 202410070453.5, filed on Jan. 17, 2024, the entire content of which is incorporated herein by reference.

TECHNICAL FIELD

The present disclosure generally relates to the field of data retrieval technologies and, more particularly, to an anonymous data retrieval method, a client, and a server.

BACKGROUND

Data retrieval is used in many fields including large language models (LLM). A current data retrieval process generally includes that: a client obtains retrieval data based on a user's operation and sends the retrieval data to a server, and the server retrieves result data that matches the retrieval data in a database and feeds back the retrieved result data to the client.

The problem with this data retrieval solution is that the client needs to send the user's retrieval data to the server, and the retrieval data may involve the user's private information. Therefore, this solution has the risk of leaking the user's personal privacy.

SUMMARY

In accordance with the disclosure, there is provided an anonymous data retrieval method including obtaining retrieval data and a first label provided by a server and matching the retrieval data, performing linear homomorphic encryption on the retrieval data and the first label to obtain retrieval data ciphertext, searching the server for a second label according to the retrieval data ciphertext, and performing anonymous retrieval on the server according to the second label and encrypted first label to obtain candidate data that matches the retrieval data.

Also in accordance with the disclosure, there is provided a client including a processor, and a storage medium storing instructions that, when executed by the processor, cause the client to perform the above method.

Also in accordance with the disclosure, there is provided an anonymous data retrieval method including receiving, from a client, retrieval data ciphertext obtained by the client performing linear homomorphic encryption on retrieval data and a first label provided by a server and matching the retrieval data, providing a second label to the client based on the retrieval data ciphertext, and in response to anonymous retrieval initiated by the client based on the second label and an encrypted first label, providing candidate data matching the retrieval data to the client.

Also in accordance with the disclosure, there is provided a server including a processor, and a storage medium storing instructions that, when executed by the processor, cause the client to perform the above method.

BRIEF DESCRIPTION OF THE DRAWINGS

To more clearly illustrate the technical solutions of the embodiments of the present disclosure, the drawings used in the description of the embodiments will be briefly introduced below. The drawings described below are some embodiments of the present disclosure. For those ordinary in the art, other drawings can be obtained based on these drawings without any creative work.

DETAILED DESCRIPTION OF THE EMBODIMENTS

To make the purpose, technical solution, and advantages of the embodiments of the present disclosure clearer, the technical solution in the embodiments of the present disclosure will be described below in conjunction with the drawings in the embodiments of the present disclosure. The described embodiments are some of the embodiments of the present application, not all of the embodiments. Based on the embodiments in the present disclosure, all other embodiments obtained by those skilled in the art without creative work are within the scope of the present disclosure.

Figure 1:
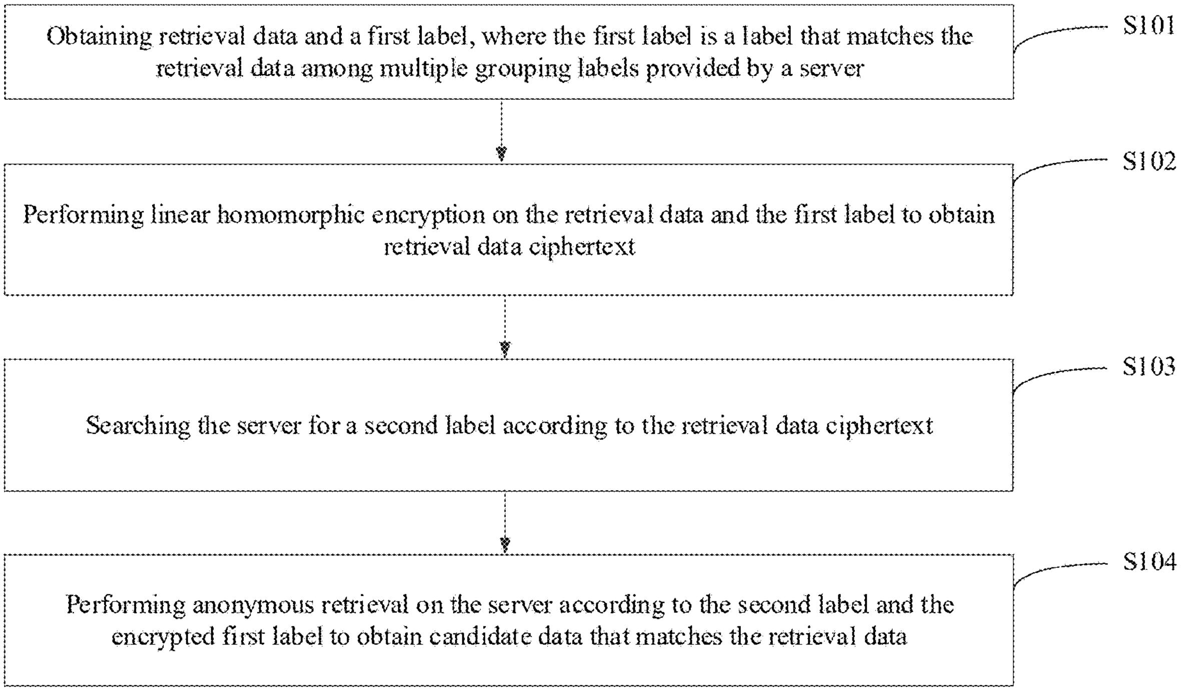
FIG. 1 is a flowchart of an anonymous data retrieval method consistent with embodiments of the present disclosure.

The present disclosure provides an anonymous data retrieval method. The anonymous data retrieval method may be executed by a client. As shown in FIG. 1, which is a flowchart of an anonymous data retrieval method consistent with embodiments of the present disclosure, in one embodiment, the method includes:

S101, obtaining retrieval data and a first label, where the first label is a label that matches the retrieval data among multiple grouping labels provided by a server;

S102, performing linear homomorphic encryption on the retrieval data and the first label to obtain retrieval data ciphertext;

S103, searching the server for a second label according to the retrieval data ciphertext; and S104, performing anonymous retrieval on the server according to the second label and the encrypted first label to obtain candidate data that matches the retrieval data.

In the present disclosure, when the client retrieves the candidate data from the server, the client may encrypt the retrieval data and send the retrieval data ciphertext to the server, and the required candidate data may be obtained by using the retrieval data ciphertext. During the entire retrieval process, the plaintext retrieval data may be only stored locally on the client and may not be sent to the server. This may not only meet the client's retrieval needs, but also prevent the retrieval data from being obtained by the server, thereby reducing the leaking risk of the privacy information of the client's user.

At S101, the client may first obtain the retrieval data, and then obtain the matching first label according to the retrieval data.

The client may obtain the retrieval data by obtaining multimedia data input from the user, converting the multimedia data into a feature vector that represents the multimedia data, and determining the converted feature vector as the retrieval data.

The multimedia data here may include any one of image data, voice data, or text data.

Taking the application scenario of the large language model as an example, the text data obtained by the client may be a question text input by the user, such as "How is the development of the XX industry in the past year?" After the client obtains the question text, the client may process the question text through word embedding technology to obtain a d-dimensional word vector that represents the question text, and determine the word vector as the retrieval data, where d is a preset positive integer.

The client may also obtain the retrieval data by retrieving candidate data matching the retrieval data from the server, and determine the candidate data as new retrieval data.

The client may obtain the first label according to the retrieval data by:

- obtaining group center data of multiple groups from the server;
- selecting, from the group center data of the multiple groups, group center data with a similarity to the retrieval data higher than the threshold; and
- determining a group label of the group to which the group center data with the similarity higher than the threshold, i.e., the selected group center data, belongs, as the first label.

The server may determine the multiple groups in advance through a clustering algorithm, and each group may include multiple pieces of candidate data stored by the server. For each group, the server may calculate the group center data of the group according to the multiple pieces of candidate data included in the group, and then send the group center data and the corresponding group labels to the client.

The group center data may be a vector with the same dimension as the retrieval data. For example, when the retrieval data is a d-dimensional word vector, the group center data may also be a d-dimensional vector.

After obtaining the retrieval data, the client may request the group center data of each group from the server, or the client may obtain the group center data of each group by active request or passive reception after establishing a communication connection with the server.

When the client obtains and stores the group center data of each group locally, obtaining the group center data may be no longer performed.

The server may update the group center data regularly, or update the group center data when new candidate data is input. The server may actively send the updated group center data to the client after updating the group center data. The client may also access the server regularly to determine whether the group center data of the server is updated, and obtain new group center data after determining that the group center data is updated.

For each piece of group center data, the client may perform calculation on the group center data and the retrieval data to obtain the similarity between the group center data and the retrieval data.

The similarity between the group center data and the retrieval data may be calculated by any suitable algorithm for calculating similarity.

As an example, in one embodiment, when the group center data and the retrieval data are both d-dimensional vectors, the client may calculate the vector inner product between the group center data and the retrieval data, and determine the calculation result as the similarity between the group center data and the retrieval data.

After calculating the similarity corresponding to each piece of group center data, one group center data whose similarity is higher than the preset first similarity threshold may be determined. The first similarity threshold may be determined by the user of the client, or may be determined by the client according to the similarity of each piece of group center data (for example, may be set to 80% of the maximum value of the similarity of each piece of group center data), or may be set by the service providing the retrieval service.

After the screening is completed, when there is only one group center data with a similarity higher than the first similarity threshold, the group label of the group to which the group center data belongs may be directly determined as the first label. When there is no group center data with a similarity higher than the first similarity threshold, the first similarity threshold may be appropriately lowered until the group center data with a similarity higher than the first similarity threshold is able to be determined. When there are multiple group center data with a similarity higher than the first similarity threshold, the group center data with the highest similarity may be selected, and the group label of the group to which the group center data with the highest similarity belongs may be determined as the first label.

Exemplarily, the retrieval data obtained by the client may be recorded as q, and the L group center data provided by the server may be recorded as $c_i$, where i is the group label of the group to which each piece of group center data belongs and its value range is 1 to L, and L is a preset positive integer. The group center data with the highest similarity determined in the above manner may be recorded as $c_i$*, and the first label corresponding to the retrieval data may be the group label i* of the group to which the group center data belongs.

At S102, obtaining the retrieval data ciphertext may include:

- obtaining a first extended template;
- inserting the retrieval data into the first extended template according to the first label to obtain first extended data; and
- performing linear homomorphic encryption on the first extended data using a randomly generated key to obtain the retrieval data ciphertext.

In one embodiment, the first extended template may be a zero vector containing multiple blocks, where the dimension of each block is consistent with the dimension of the retrieval data and the number of blocks in the first extended template is consistent with the number of groups of the server.

In some embodiments, the first extended template may be represented as ($A_1$, $A_2$ . . . $A_i$ . . . $A_L$), where $A_1$ to $A_L$ represent L blocks constituting the first extended template, each of which is a zero vector with the same dimension as the retrieval data. That is, each block may be a d-dimensional vector, and the value of each dimension of the vector may be 0.

The first extended template may be pre-stored locally on the client and read from the storage medium when the retrieval data ciphertext needs to be obtained, or it may be generated according to the retrieval data dimension and the number of groups in the server when needed.

For the above-mentioned first extended template, inserting the retrieval data into the first extended template may include replacing one block indicated by the first label in the first extended template with the retrieval data to obtain the first extended data.

For example, in the above example, the first label is i*, and the block $A_i$* corresponding to i* may be found in the first extended template, and the block $A_i$* is replaced with the retrieval data q. The replaced vector may be the first extended data. Assuming that i*−1 is greater than 1 and i*+1 is less than L, the first extended data in this example may be expressed as ($A_1$, . . . $A_{i^*-1}$, q, $A_{i^*+1}$ . . . AL), denoted as q'.

After obtaining the first extended data q', the first extended data may be linearly homomorphically encrypted with the randomly generated key R to obtain the retrieval data ciphertext, denoted as Enc (q')=(Enc ($A_1$), . . . Enc ($A_{i^*-1}$), Enc (q), Enc ($A_{i^*+1}$) . . . Enc ($A_L$)).

For example, assuming that i* is equal to 2 and L is equal to 4, the above retrieval data ciphertext may be represented by Table 1.

TABLE 1

| |
|---|
| Enc ($A_1$) |
| Enc (q) |
| Enc ($A_3$) |
| Enc ($A_4$) |

Linear homomorphic encryption may be a type of encryption algorithm that meets the following conditions.

For the data a to be encrypted and a constant b, the data a may be encrypted using the linear homomorphic encryption algorithm to obtain the corresponding ciphertext c. A linear operation (such as addition, multiplication, etc.) may be performed on c and the constant b to obtain a first result. The same linear operation may be performed on a and the constant b to obtain a second result. The first result may be decrypted using a decryption algorithm corresponding to the linear homomorphic encryption algorithm to obtain a third result, where the second result and the third result are the same.

In this embodiment, the linear homomorphic encryption algorithm used to encrypt the first extended data according to the key may be any linear homomorphic encryption algorithm in existing technologies. As an example, the Paillier encryption scheme may be used to encrypt the first extended data.

For data in the form of vectors or matrices, using the linear homomorphic encryption algorithm for encryption may include using the linear homomorphic encryption algorithm to encrypt each value constituting the vectors or matrices to obtain the ciphertext corresponding to each value. Therefore, the ciphertext obtained after the data in the form of vectors and matrices is encrypted may still be in the form of vectors and matrices, and the ciphertext and the plaintext may have the same dimension (in the case of vectors), or have the same number of rows and columns (in the case of matrices).

For example, assuming that vector X is equal to (1, 2, 3), and Enc( ) represents the linear homomorphic encryption process, then Enc(X) may be (Enc(1), Enc(2), Enc(3)).

Therefore, the first extended data q' may be a d*L-dimensional vector, and the encrypted retrieval data ciphertext Enc(q') may also be a d*L-dimensional vector.

At S103, the client may search for the second label by:

sending the retrieval data ciphertext to the server;

receiving the label information ciphertext fed back by the server based on the retrieval data ciphertext; and decrypting the label information ciphertext to obtain the second label carried in the label information ciphertext.

After receiving the retrieval data ciphertext, the server may process the retrieval data ciphertext and multiple pieces of candidate data stored in the server to obtain the label information ciphertext, and then feed the label information ciphertext back to the client. After receiving the label information ciphertext, the client may obtain the second label from the label information ciphertext by:

decrypting the label information ciphertext to obtain the label information, where the label information includes the similarity between the retrieval data and each piece of candidate data in the group corresponding to the first label; and according to the label information, determining a label of the candidate data with a similarity higher than the threshold as the second label.

In this embodiment, the multiple pieces of candidate data stored in the server may be represented by a matrix M, and each element of the matrix may be one piece of candidate data. The candidate data may have a vector with the same dimension as the retrieval data.

The label information may be represented by M*q', and the corresponding label information ciphertext may be represented by Enc(M*q').

When the first extended data q' includes the retrieval data q and several zero vector blocks, the label information M*q' may be expressed as follows:

$$(\langle v_{(i^*,1)}, q\rangle \ldots \langle v_{(i^*,k)}, q\rangle \ldots \langle v_{(i^*,K)}, q\rangle).$$

where $v_{(i^*, k)}$ represents the k-th candidate data included in the group corresponding to the first label i*, K is the total number of pieces candidate data included in the group corresponding to the first label i*, and $\langle v_{(i^*, k)}, q\rangle$ represents the inner product of the retrieval data q and the candidate data $v_{(i^*, k)}$, which is equivalent to the similarity between the retrieval data and the candidate data.

After obtaining the above label information, the client may determine the similarity higher than the preset second similarity threshold. The second similarity threshold may be determined by the user of the client, may be determined by the client according to the similarity of each piece of candidate data in the group corresponding to the first label, for example, set to 80% of the maximum value of the similarity of each piece of candidate data, or may be set by the server providing the search service.

After the screening is completed, when only one similarity is higher than the second similarity threshold, the label k corresponding to the similarity may be directly determined as the second label. When no similarity is higher than the second similarity threshold, the second similarity threshold may be appropriately lowered until the similarity higher than the second similarity threshold is available. When multiple similarities are higher than the second similarity threshold, the highest similarity may be selected and the label k corresponding to the similarity may be determined as the second label.

The second label may be represented by k*.

After obtaining the second label, the client may use the first label and the second label to perform anonymous retrieval to obtain the candidate data matching the retrieval data from the server. The anonymous retrieval may include:

performing linear homomorphic encryption on the first label to obtain the first label ciphertext;

sending the first label ciphertext to the server;

receiving the candidate data ciphertext fed back by the server based on the first label ciphertext; and searching the candidate data ciphertext according to the second label to obtain the candidate data matching the retrieval data.

Encrypting the first label to obtain the first label ciphertext may include:

obtaining a second extended template;

processing the second extended template according to the first label to obtain second extended data; and performing linear homomorphic encryption on the second extended data using a key to obtain the first label ciphertext.

The second extended template may include a plurality of square matrices whose elements are all zero. The number of rows of each square matrix may be consistent with the dimension of the retrieval data, and the number of the plurality of square matrices in the second extended template may be consistent with the number of groups in the server.

In some examples, the second extended template may be represented as $(B_1, B_2 \ldots B_i \ldots B_L)$, where $B_1$ to $B_L$ represent L square matrices constituting the second extended template. The number of rows and columns of each square matrix may be consistent with the dimension of the retrieval data, that is, each square matrix in $B_1$ to $B_L$ may be a square matrix with d rows and d columns, and each element of each square matrix is 0.

The second extended template may be pre-stored locally on the client and read from the storage medium when the retrieval data ciphertext needs to be obtained, or may be generated according to the dimension of the retrieval data and the number of groups in the server group when needed.

After obtaining the second extended template, the client may replace one square matrix indicated by the first label in the second extended template with the unit matrix with the same number of rows and columns to obtain the second extended data Q.

Combined with the above example, the client may replace the i*-th square matrix in the second extended template $(B_1, B_2 \ldots B_i \ldots B_L)$ with the unit matrix with the same number of rows and columns. That is, the i*-th square matrix in the second extended template may be replaced with a square matrix E with d rows and d columns where all elements on the diagonal of E are 1 and all elements on the off-diagonal are 0, to obtain the second extended data Q. Assuming that i*−1 is greater than 1 and i*+1 is less than L, the second extended data Q in this example may be expressed as $(B_1, \ldots B_{i^*-1}, E, B_{i^*+1} \ldots B_L)$.

After obtaining the second extended data, the client may use the linear homomorphic encryption algorithm to encrypt the second extended data based on the key R to obtain the first label ciphertext, recorded as Enc(Q).

After the client sends the first label ciphertext to the server, the server may process the matrix M including the first label ciphertext and the stored multiple pieces of candidate data to obtain the candidate data ciphertext, recorded as Enc (M*Q), and then the server may feed the candidate data ciphertext back to the client.

When the client generates the second extended data in the above manner, after receiving the candidate data ciphertext, the client may decrypt the candidate data ciphertext to obtain the candidate data set including the candidate data contained in the group corresponding to the first label:

$(v_{(i^*, 1)} \ldots v_{(i^*, k)} \ldots v_{(i^*, K)})$.

Then, the client may find the candidate data that matches the retrieval data in the candidate data set according to the second label k*, that is, $v_{(i^*, k^*)}$.

Another embodiment of the present disclosure also provides an anonymous data retrieval method that may be executed by the server.

Figure 2:
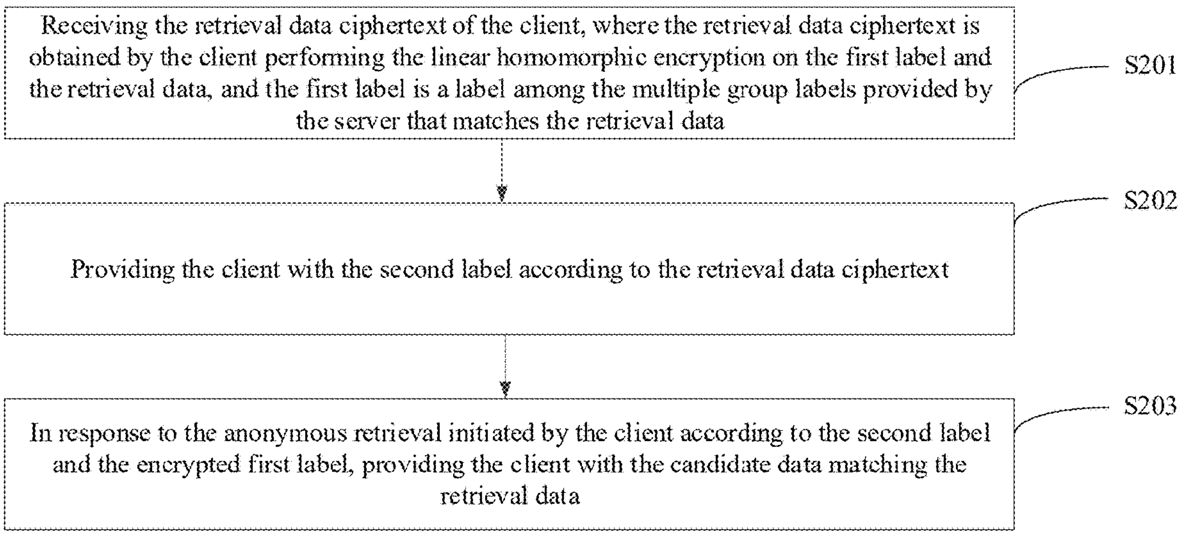
FIG. 2 is a flowchart of another anonymous data retrieval method consistent with embodiments of the present disclosure.

FIG. 2 is a flowchart of another anonymous data retrieval method. The method includes:

S201, receiving the retrieval data ciphertext from the client, where the retrieval data ciphertext is obtained by the client performing the linear homomorphic encryption on the first label and the retrieval data, and the first label is a label among the multiple group labels provided by the server that matches the retrieval data;

S202, providing the client with the second label according to the retrieval data ciphertext; and S203, in response to the anonymous retrieval initiated by the client according to the second label and the encrypted first label, providing the client with the candidate data matching the retrieval data.

Before S201, the server may provide the client with the group center data and group labels of each group of the candidate data by:

performing clustering processing on multiple pieces of candidate data stored by the server to obtain multiple groups of the candidate data; and sending the group center data and group label of each group to the client.

Each piece of candidate data of the server may correspond to a document stored by the server. For each stored document, the server may process the document through word embedding technology to obtain the word vector corresponding to the document, and determine the word vector as the candidate data corresponding to the document.

One candidate data may be a vector with the same dimension as the retrieval data, that is, the candidate data may be a d-dimensional word vector corresponding to the document.

After obtaining multiple pieces of candidate data, the server may use the k-means clustering algorithm or other clustering algorithms to perform clustering on these candidate data, thereby dividing these candidate data into L groups.

The number of groups L may be a preset fixed value or a floating value that changes with the total number of pieces of candidate data. For example, assuming that the server stores N documents and obtains N candidate data through word embedding technology, the server may perform square root on N to obtain the square root of N, and round the square root of N to obtain the number of groups L.

After the grouping is completed, for each group, the server may calculate the group center data of the group based on the candidate data contained in the group. The calculation method is not limited. In some examples, the group center data of the group may be equal to the average value of all candidate data contained in the group.

After the server sends the group center data and group labels to the client, the client may determine the first label corresponding to the retrieval data in the group labels based on the retrieval data, and then send the retrieval data ciphertext to the server based on the first label and the retrieval data.

After the server receives the retrieval data ciphertext, it may provide the second label to the client by:

according to the retrieval data ciphertext provided by the client, processing the multiple pieces of candidate data stored in the server to obtain the label information ciphertext carrying the second label; and sending the label information ciphertext to the client.

After the client receives the label information ciphertext, the second label may be determined from the label information ciphertext in the manner described above.

The server may process the candidate data according to the retrieval data ciphertext to obtain the label information ciphertext by:

generating a candidate data matrix according to the multiple pieces of candidate data stored in the server, where each column of the candidate data matrix may include multiple pieces of candidate data belonging to one group; and according to the retrieval data ciphertext provided by the client, calculating the candidate data matrix to obtain the label information ciphertext carrying the second label.

The candidate data matrix may be equivalent to the aforementioned matrix M. The elements of M may be the candidate data stored by the server. The number of columns of M may be consistent with the number of groups L determined during clustering, and each column may correspond to one group. For example, the first column may correspond to the first group, and the second column may correspond to the second group. Each column of M may include one candidate data in the group corresponding to the column.

The number of rows of M may be consistent with the number of pieces of candidate data in one group including the most candidate data among the L groups. Exemplarily, assuming that there are 4 groups, of which the first group includes 5 pieces of candidate data, the second group includes 3 pieces of candidate data, the third group includes 6 pieces of candidate data, and the fourth group includes 4 pieces of candidate data, therefore the number of rows of M is 6.

When the number of pieces of candidate data included in a column of M is less than the number of rows of M, the missing part may be filled with 0 vectors of the same dimension as the candidate data.

As an example of a candidate data matrix, assuming that the server stores 16 pieces of candidate data, which are divided into 4 groups after clustering, and each group includes 4 pieces of candidate data, then the candidate data matrix M may be represented by Table 2 below.

TABLE 2

| | | | |
|---|---|---|---|
| $v_{(1, 1)}$ | $v_{(1, 2)}$ | $v_{(1, 3)}$ | $v_{(1, 4)}$ |
| $v_{(2, 1)}$ | $v_{(2, 2)}$ | $v_{(2, 3)}$ | $v_{(2, 4)}$ |
| $v_{(3, 1)}$ | $v_{(3, 2)}$ | $v_{(3, 3)}$ | $v_{(3, 4)}$ |
| $v_{(4, 1)}$ | $v_{(4, 2)}$ | $v_{(4, 3)}$ | $v_{(4, 4)}$ |

In Table 2, $v_{(1, 2)}$ represents the first candidate data in the second group, $v_{(2, 3)}$ represents the second candidate data in the third group, and the meanings of other elements are similar.

When the server calculates the candidate data matrix based on the retrieval data ciphertext, it may perform matrix multiplication on the candidate data matrix and the retrieval data ciphertext as shown in Equation (1) to obtain the label information ciphertext.

$$M * Enc(q') = Enc(M * q') \quad (1)$$

In Equation (1), the retrieval data ciphertext is equivalent to a d*L-dimensional column vector, and each row of M is equivalent to a d*L-dimensional row vector.

Because of the characteristics of the linear homomorphic encryption algorithm, the data obtained by performing matrix multiplication on the candidate data matrix and the retrieval data ciphertext may be equivalent to the data obtained by performing matrix multiplication on the candidate data matrix and the first extended data q' and encrypting the result of the operation using the linear homomorphic encryption algorithm.

Continuing with the above example, assuming that the retrieval data ciphertext is shown in Table 1 and the candidate data matrix M is shown in Table 2, the label information ciphertext calculated according to Equation (1) may be expressed in Table 3 below.

TABLE 3

| |
|---|
| $Enc(<v_{(1, 2)}, q>)$ |
| $Enc(<v_{(2, 2)}, q>)$ |
| $Enc(<v_{(3, 2)}, q>)$ |
| $Enc(<v_{(4, 2)}, q>)$ |

After the client decrypts the label information ciphertext shown in Table 3, the following label information may be obtained:

$$(\langle v_{(1,2)}, q\rangle, \langle v_{(2,2)}, q\rangle, \langle v_{(3,2)}, q\rangle, \langle v_{(4,2)}, q\rangle).$$

After the client determines the second label, it may initiate an anonymous retrieval process based on the first label and the second label in the manner described above. At this time, the server may respond to the anonymous retrieval initiated by the client and provide the client with candidate data matching the retrieval data by:

receiving the first label ciphertext provided by the client, which is obtained by encrypting the first label by the client;

processing the multiple pieces of candidate data stored by the server according to the first label ciphertext to obtain the candidate data ciphertext including the candidate data matching the retrieval data; and sending the candidate data ciphertext to the client.

The first label ciphertext may be obtained by the client in the aforementioned manner and sent to the server. After receiving the first label ciphertext, the server may process the multiple pieces of candidate data according to the first label ciphertext to obtain the candidate data ciphertext by:

generating a candidate data matrix according to the multiple pieces of candidate data stored in the server, where each column of the candidate data matrix includes multiple pieces of candidate data belonging to one group; and calculating the candidate data matrix according to the first label ciphertext to obtain the candidate data ciphertext including the candidate data matching the retrieval data.

When calculating the candidate data matrix according to the first label ciphertext, the server may perform matrix multiplication operation on the first label ciphertext and the candidate data matrix according to Equation (2) to obtain the candidate data ciphertext.

$$M * Enc(Q) = Enc(M * Q) \quad (2)$$

Continuing with the aforementioned example, assuming that the number of candidate data groups L is 4, the candidate data matrix M is as shown in Table 2, and the first label i* is equal to 2, the first label ciphertext generated by the client in the aforementioned manner may be expressed as shown in Table 4.

TABLE 4

| |
|---|
| $Enc(B_1)$ |
| Enc(E) |
| $Enc(B_3)$ |
| $Enc(B_4)$ |

The candidate data ciphertext obtained by performing matrix multiplication operation on the first label ciphertext in Table 4 and the candidate data matrix according to Equation (2) may be expressed as follows in Table 5.

TABLE 5

| |
|---|
| $Enc(v_{(1, 2)})$ |
| $Enc(v_{(2, 2)})$ |
| $Enc(v_{(3, 2)})$ |
| $Enc(v_{(4, 2)})$ |

After the client decrypts the ciphertext of the candidate data, it may obtain the four candidate data included in the group corresponding to the first label i*=2 (i.e., the second group obtained after clustering by the server), v(1, 2), v(2, 2), v(3, 2), v(4, 2), and then the client may find the candidate data corresponding to the second label in the group as the candidate data matching the retrieval data. For example, assuming that the candidate data k* is equal to 3, the client may obtain the third candidate data in the second group, i.e., v(3, 2) as the candidate data matching the retrieval data.

Figure 3:
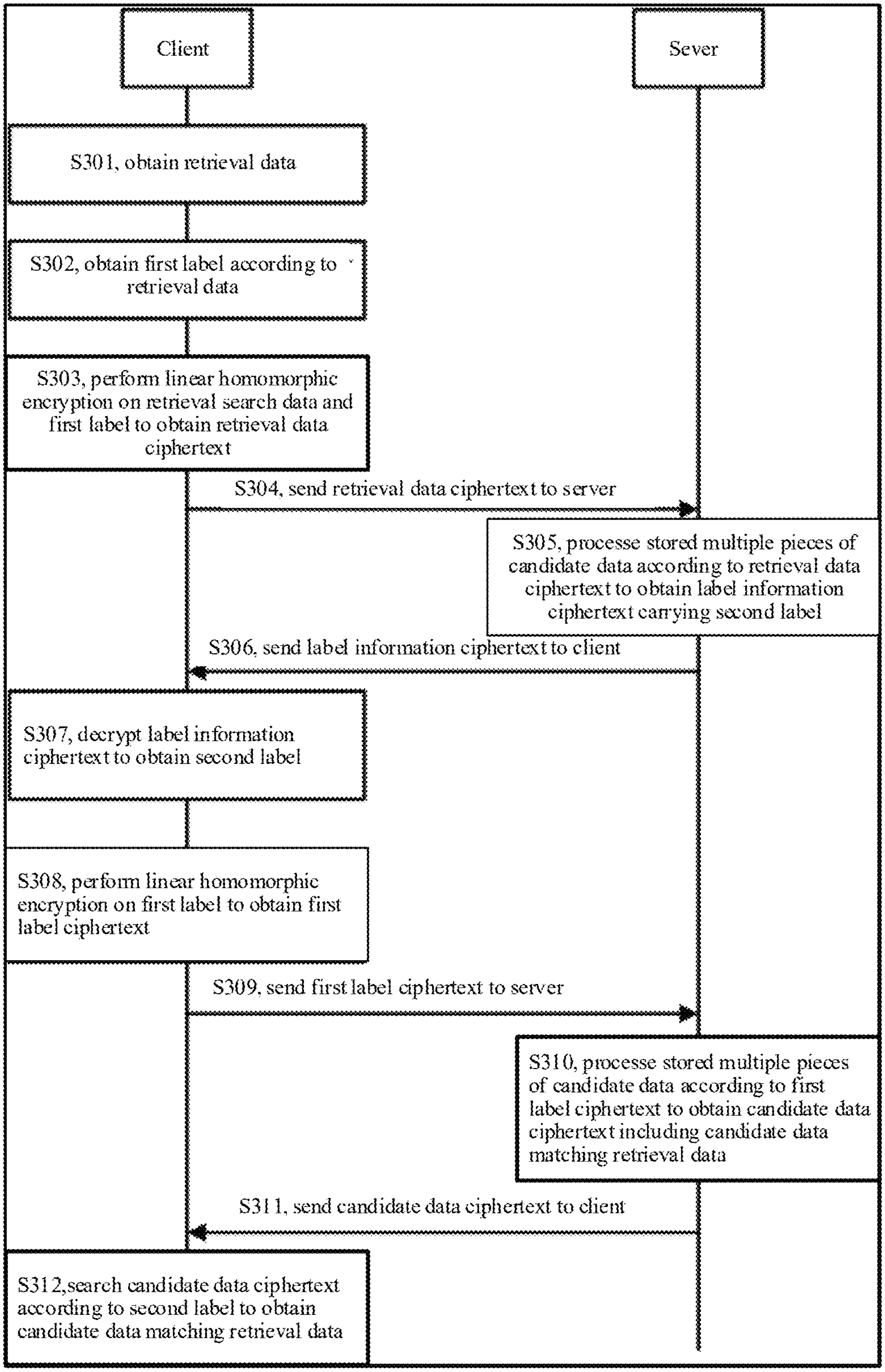
FIG. 3 is a schematic diagram showing interaction between a client and a server in an anonymous data retrieval method consistent with embodiments of the present disclosure.

In the anonymous data retrieval method provided in the embodiments of the present disclosure, the information interaction process between the client and the server may include, as shown in FIG. 3.

S301, the client obtains the retrieval data.

S302, the client obtains the first label according to the retrieval data.

S303, the client performs linear homomorphic encryption on the retrieval data and the first label to obtain the retrieval data ciphertext.

S304, the client sends the retrieval data ciphertext to the server.

S305, the server processes the stored multiple pieces of candidate data according to the retrieval data ciphertext to obtain the label information ciphertext carrying the second label.

S306, the server sends the label information ciphertext to the client.

S307, the client decrypts the label information ciphertext to obtain the second label carried in the label information ciphertext.

S308, the client performs linear homomorphic encryption on the first label to obtain the first label ciphertext.

S309, the client sends the first label ciphertext to the server.

S310, the server processes the stored multiple pieces of candidate data according to the first label ciphertext to obtain the candidate data ciphertext including the candidate data matching the retrieval data.

S311, the server sends the candidate data ciphertext to the client.

S312, the client searches the candidate data ciphertext according to the second label to obtain the candidate data matching the retrieval data.

For the implementation method of each process in the above information interaction process, reference may be made to the relevant processes in the anonymous data retrieval method executed by the client and the server, the description of which will not be repeated.

Figure 4:
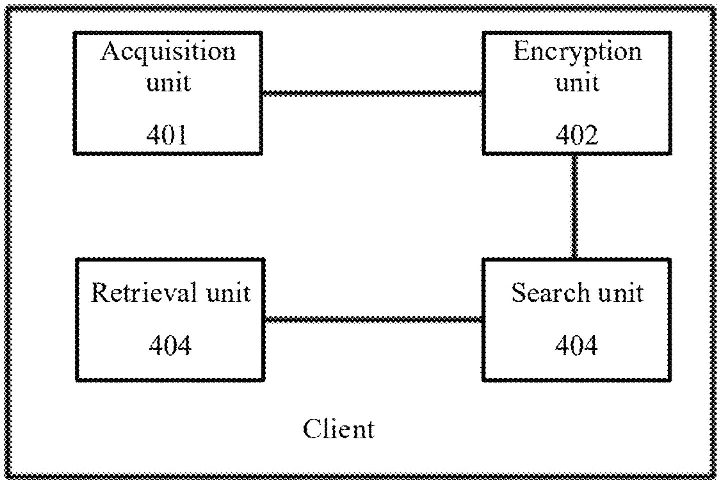
FIG. 4 is a schematic structural diagram of a client consistent with embodiments of the present disclosure.

The embodiments of the present disclosure also provide a client. FIG. 4 is a schematic structural diagram of the client. As shown in FIG. 4, in one embodiment, the client includes:

an acquisition unit 401, configured to obtain the retrieval data and the first label, where the first label is a label that matches the retrieval data among multiple group labels provided by the server;

an encryption unit 402, configured to perform linear homomorphic encryption on the retrieval data and the first label to obtain the retrieval data ciphertext;

a search unit 403, configured to search the server for the second label according to the retrieval data ciphertext; and a retrieval unit 404, configured to perform anonymous retrieval on the server according to the second label and the encrypted first label to obtain the candidate data matching the retrieval data.

Optionally, when the search unit 403 searches the server for the second label according to the retrieval data ciphertext, it may be used to:

send the retrieval data ciphertext to the server;

receive the label information ciphertext fed back by the server according to the retrieval data ciphertext; and decrypt the label information ciphertext to obtain the second label carried in the label information ciphertext.

Optionally, when the retrieval unit 404 performs the anonymous retrieval on the server according to the second label and the encrypted first label and obtains candidate data matching the retrieval data, it may be used to:

perform linear homomorphic encryption processing on the first label to obtain the first label ciphertext;

send the first label ciphertext to the server;

receive the candidate data ciphertext fed back by the server according to the first label ciphertext; and search the candidate data ciphertext according to the second label to obtain the candidate data matching the retrieval data.

Optionally, when the acquisition unit 401 obtains the first label, it may be used to:

obtain the group center data of multiple groups from the server;

select, from the group center data of the multiple groups, group center data with a similarity to the retrieval data higher than the threshold; and determine the group label of the group to which the group center data with the similarity higher than the threshold belongs as the first label belongs.

Optionally, when the encryption unit 402 performs linear homomorphic encryption on the retrieval data and the first label to obtain the retrieval data ciphertext, it may be used to:

obtain a first extended template;

insert the retrieval data into the first extended template according to the first label to obtain the first extended data; and perform linear homomorphic encryption on the first extended data using a randomly generated key to obtain the retrieval data ciphertext.

Optionally, the first extended template may be a zero vector including multiple blocks. The dimension of each block may be consistent with the dimension of the retrieval data, and the number of blocks in the first extended template may be consistent with the number of groups of the server;

When the encryption unit 402 inserts the retrieval data into the first extended template according to the first label to obtain the first extended data, it may be used to:

replace one block indicated by the first label in the first extended template with the retrieval data to obtain the first extended data.

Optionally, when the retrieval unit 404 performs linear homomorphic encryption on the first label to obtain the first label ciphertext, it may be used to:

obtain a second extended template;

process the second extended template according to the first label to obtain the second extended data; and perform linear homomorphic encryption on the second extended data using a key to obtain the first label ciphertext.

Optionally, the second extended template may include a plurality of square matrices whose elements are all zero, the number of rows of each square matrix may be consistent with the dimension of the retrieval data, and the number of the plurality of square matrices in the second extended template may be consistent with the number of groups of the server;

When the retrieval unit 404 processes the second extended template according to the first label to obtain the second extended data, it may be used to:

replace the square matrix indicated by the first label in the second extended template with a unit matrix with the same number of rows and columns to obtain the second extended data.

Optionally, when the search unit 403 decrypts the label ciphertext information and obtains the second label carried in the label information ciphertext, it may be used to:

decrypt the label information ciphertext to obtain the label information, where the label information includes the similarity between the retrieval data and each piece of candidate data in the group corresponding to the first label; and according to the label information, determine the label of the candidate data with a similarity higher than a threshold as the second label.

The specific working principle and beneficial effects of the client provided in this embodiment may refer to the relevant steps and beneficial effects of the anonymous data retrieval method performed by the client provided in any embodiment of the present disclosure, and will not be repeated.

Figure 5:
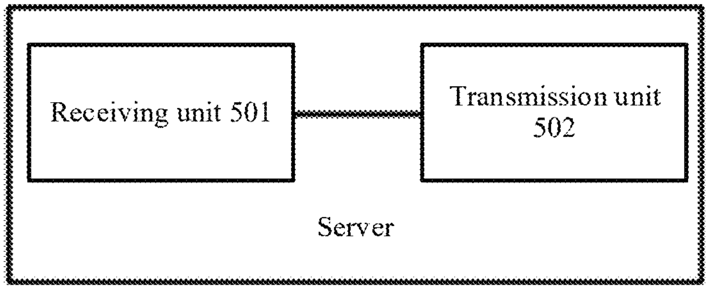
FIG. 5 is a schematic structural diagram of a server consistent with embodiments of the present disclosure.

The present disclosure also provides a server. FIG. 5 is a schematic structural diagram of a server consistent with embodiments of the present disclosure. As shown in FIG. 5, in one embodiment, the server may include:

a receiving unit 501, configured to receive the retrieval data ciphertext from a client, where the retrieval data ciphertext is obtained by the client performing linear homomorphic encryption processing on the first label and the retrieval data, and the first label is a label that matches the retrieval data among multiple group labels provided by the server; and a transmission unit 502, configured to: provide the second label to the client according to the retrieval data ciphertext; and, in response to the anonymous retrieval initiated by the client according to the second label and the encrypted first label, provide the candidate data matching the retrieval data to the client.

Optionally, the transmission unit 502 may also be used to:

cluster multiple pieces of candidate data stored in the server to obtain multiple groups of candidate data; and send the group center data and group label of each group to the client.

Optionally, when the transmission unit 502 provides the second label to the client according to the retrieval data ciphertext, it may be configured to:

process the multiple pieces of candidate data stored in the server according to the retrieval data ciphertext provided by the client to obtain the label information ciphertext carrying the second label; and send the label information ciphertext to the client.

Optionally, when the transmission unit 502 processes the multiple pieces of candidate data stored in the server according to the retrieval data ciphertext provided by the client to obtain the label information ciphertext carrying the second label, it may be used to:

generate a candidate data matrix according to the multiple pieces of candidate data stored in the server, where each column of the candidate data matrix includes multiple pieces of candidate data belonging to one group; and calculate the candidate data matrix according to the retrieval data ciphertext provided by the client to obtain the label information ciphertext carrying the second label.

Optionally, when the transmission unit 502 responds to the anonymous retrieval initiated by the client according to the second label and the encrypted first label and provides the client with the candidate data matching the retrieval data, it may be used to:

receive the first label ciphertext provided by the client, where the first label ciphertext is obtained by encrypting the first label by the client;

process the multiple pieces of candidate data stored in the server according to the first label ciphertext to obtain the candidate data ciphertext including the candidate data matching the retrieval data; and send the candidate data ciphertext to the client.

Optionally, when the transmission unit 502 processes the multiple pieces of candidate data stored in the server according to the first label ciphertext and obtains the candidate data ciphertext including the candidate data matching the retrieval data, it may be used to:

generate a candidate data matrix according to the multiple pieces of candidate data stored in the server, where each column of the candidate data matrix includes multiple pieces of candidate data belonging to one group; and calculate the candidate data matrix according to the first label ciphertext to obtain the candidate data ciphertext including the candidate data matching the retrieval data.

The specific working principle and beneficial effects of the server provided in this embodiment may refer to the relevant steps and beneficial effects in the anonymous data retrieval method performed by the server provided in any embodiment of the present disclosure, and will not be repeated.

Each embodiment in this specification is described in a progressive manner, and each embodiment focuses on the differences from other embodiments, and the same and similar parts between the embodiments can be referred to each other.

For the convenience of description, the above system or device is described by function and is divided into various modules or units and described separately. Of course, when implementing the present disclosure, the functions of each unit can be implemented in the same or one or more software and/or hardware. It can be seen from the description of the above implementations that a person skilled in the art can clearly understand that the present disclosure can be implemented by means of software plus a necessary general hardware platform. Based on this understanding, the technical solution of the present disclosure can be embodied in the form of a software product, and the computer software product can be stored in a storage medium, such as ROM/RAM, a disk, an optical disk, etc., including several instructions to enable a computer device (which can be a personal computer, a client, a server, or a network device, etc.), such as a processor of the computer device, to execute the methods described in each embodiment of the present disclosure or some parts of the embodiments.

In the present disclosure, relational terms such as first, second, third or fourth are only used to distinguish one entity or operation from another entity or operation, and do not necessarily require or imply any such actual relationship or order between these entities or operations. Moreover, the terms “include,” “comprise” or any other variation thereof are intended to encompass non-exclusive inclusion, such that a process, method, article, or apparatus that includes a list of elements includes not only those elements, but also other elements not explicitly listed, or elements inherent to such process, method, article, or apparatus. In the absence of further limitations, an element defined by the phrase “including a” does not exclude the presence of additional identical elements in the process, method, article, or apparatus that includes the element.

Various embodiments have been described to illustrate the operation principles and exemplary implementations. Those skilled in the art would understand that the present disclosure is not limited to the specific embodiments described herein and there can be various other changes, rearrangements, and substitutions. Thus, while the present disclosure has been described in detail with reference to the above described embodiments, the present disclosure is not limited to the above described embodiments, but may be embodied in other equivalent forms without departing from the spirit and scope of the present disclosure.

What is claimed is:

1. An anonymous data retrieval method comprising:
- obtaining retrieval data and a first label matching the retrieval data;
- performing linear homomorphic encryption on the retrieval data and the first label to obtain retrieval data ciphertext;
- searching a server for a second label according to the retrieval data ciphertext; and
- performing anonymous retrieval on the server according to the second label and encrypted first label to obtain candidate data that matches the retrieval data.

2. The method according to claim 1, wherein obtaining the first label includes:
- obtaining a plurality of pieces of group center data, each belonging to one of a plurality of groups, from the server;
- selecting, from the plurality of pieces of group center data, the group center data with a similarity to the retrieval data higher than a threshold; and
- determining a group label of one group of the plurality of groups to which the group center data with the similarity higher than the threshold belongs as the first label.

3. The method according to claim 1, wherein performing the linear homomorphic encryption on the retrieval data and the first label to obtain the retrieval data ciphertext includes:
- obtaining an extended template;
- inserting the retrieval data into the extended template according to the first label to obtain extended data; and
- performing the linear homomorphic encryption on the extended data using a randomly generated key to obtain the retrieval data ciphertext.

4. The method according to claim 3, wherein:
- the extended template includes a zero vector including a plurality of blocks, a dimension of each of the plurality of blocks being consistent with a dimension of the retrieval data and a number of the plurality of blocks in the extended template being consistent with a number of plurality of groups; and
- inserting the retrieval data into the extended template includes:
  - replacing one block of the plurality of blocks indicated by the first label in the extended template with the retrieval data to obtain the extended data.

5. The method according to claim 1, wherein performing the anonymous retrieval includes:
- performing linear homomorphic encryption on the first label to obtain label ciphertext;
- sending the label ciphertext to the server;
- receiving candidate data ciphertext fed back by the server based on the label ciphertext; and
- searching the candidate data ciphertext according to the second label to obtain candidate data matching the retrieval data.

6. The method according to claim 5, wherein performing the linear homomorphic encryption on the first label to obtain the label ciphertext includes:
- obtaining an extended template;
- processing the extended template according to the first label to obtain extended data; and
- performing the linear homomorphic encryption on the extended data using a key to obtain the label ciphertext.

7. The method according to claim 6, wherein:
- the extended template includes a plurality of square matrices, elements of each of the plurality of square matrices all being zero, a number of rows of each of the plurality of square matrices being consistent with a dimension of the retrieved data, and a number of the plurality of square matrices in the extended template being consistent with a number of the plurality of groups; and
- processing the extended template includes:
  - replacing one square matrix indicated by the first label in the extended template with a unit matrix with a same number of rows and columns to obtain the extended data.

8. The method according to claim 1, wherein searching the server for the second label includes:
- sending the retrieval data ciphertext to the server;
- receiving label information ciphertext fed back by the server according to the retrieval data ciphertext; and
- decrypting the label information ciphertext to obtain the second label carried in the label information ciphertext.

9. The method according to claim 8, wherein decrypting the label information ciphertext includes:
- decrypting the label information ciphertext to obtain label information including the similarity between the retrieval data and each piece of candidate data in the group corresponding to the first label; and determining, based on the label information, the label of the candidate data with a similarity higher than a threshold as the second label.

10. A client comprising:

a processor; and a storage medium storing instructions that, when executed by the processor, cause the client to perform the method of claim 1.

11. An anonymous data retrieval method comprising:

receiving retrieval data ciphertext from a client, the retrieval data ciphertext being obtained by the client performing linear homomorphic encryption on a first label and retrieval data, and the first label matching the retrieval data;

providing a second label to the client based on the retrieval data ciphertext; and in response to anonymous retrieval initiated by the client based on the second label and an encrypted first label, providing candidate data matching the retrieval data to the client.

12. The method according to claim 11, further comprising:

clustering a plurality of pieces of candidate data stored in the server to obtain a plurality of groups of the candidate data; and sending group center data and a group label of each of the plurality of groups to the client.

13. The method according to claim 11, wherein providing the second label to the client includes:

processing a plurality of pieces of candidate data stored in the server according to the retrieval data ciphertext provided by the client to obtain label information ciphertext carrying the second label; and sending the label information ciphertext to the client.

14. The method according to claim 13, wherein processing the plurality of pieces of candidate data includes:

generating a candidate data matrix based on the plurality of pieces of candidate data, each column of the candidate data matrix including two of more pieces of the plurality of pieces of candidate data that belonging to a same one of a plurality of groups in the server;

calculating the candidate data matrix based on the retrieval data ciphertext provided by the client to obtain the label information ciphertext carrying the second label.

15. The method according to claim 11, wherein in response to the anonymous retrieval initiated by the client based on the second label and the encrypted first label and providing the candidate data matching the retrieval data to the client includes:

receiving the first label ciphertext provided by the client, the first label ciphertext being obtained by the client encrypting the first label;

processing a plurality of pieces of candidate data stored in the server according to the first label ciphertext to obtain the candidate data ciphertext including the candidate data matching the retrieval data; and sending the candidate data ciphertext to the client.

16. The method according to claim 15, wherein processing the plurality of pieces of candidate data includes:

generating a candidate data matrix based on the plurality of pieces of candidate data, each column of the candidate data matrix including multiple two or more pieces of the plurality of pieces of candidate data that belong to a same one of a plurality of groups in the server; and calculating the candidate data matrix based on the first label ciphertext to obtain the candidate data ciphertext including the candidate data that matches the retrieval data.

17. A server, comprising:

a processor, and a storage medium storing instructions that, when executed by the processor, cause the server to perform the method of claim 11.

* * * * *